March 29, 1966  H. M. WOLTERING  3,243,003
GROUND EFFECT MACHINE
Filed Aug. 30, 1961

INVENTOR.
Howard M. Woltering.

United States Patent Office 3,243,003
Patented Mar. 29, 1966

3,243,003
GROUND EFFECT MACHINE
Howard M. Woltering, % General Delivery,
Covington, Ky.
Filed Aug. 30, 1961, Ser. No. 135,079
4 Claims. (Cl. 180—7)

This invention relates to vehicles and more particularly to that type of vehicle known as a Ground Effect Machine. Men have long desired to have a vehicle without wheels that will both rest and glide on a layer of air since its cushioning effect has been recognized for years as an aircraft, for example, has displayed an increase in efficiency during the brief period it is real close to the ground. Then too, it has always been the desire of vehicle designers and builders to find some way to get away from the drag produced by wheels rolling along the ground.

It is therefore an object of this invention to provide a Ground Effect Machine that for all practical purposes travels at ground level and yet not have any of the many disadvantages of drag that is had with wheel supported vehicles.

Another object of this invention is to provide a Ground Effect Machine that will travel over rough and uneven terrain as well as on a flat surface like a concrete highway.

Another object of this invention is to provide a Ground Effect Machine having simple controls that require a minimum amount of skill to operate, thus making it possible for anyone who can drive a car to use this machine.

Another object of this invention is to provide a Ground Effect Machine which of course does not have any transmission and therefore does away with this expensive piece of mechanism.

Another object of this invention is to provide a Ground Effect Machine that is less costly to manufacture than an automobile and can therefore be mass produced at a price well within the reach of everyone.

Another object of this invention is to provide a land vehicle that does not have wheels with pneumatic tires for support and travel and therefore dispenses with the costly and time consuming tire repairs.

Another object of this invention is to provide a Ground Effect Machine that overcomes the traditional foes of mobility, namely, mud, swamp, sand, snow and arctic tundra.

Another object of this invention is to provide a Ground Effect Machine that will go forward, reverse or hover over a given spot, all with equal ease.

Still another object of this invention is to provide a Ground Effect Machine that can readily be adapted to boats, sleds and the like.

Other and further objects and advantages of this invention will be hereinafter described in the appended claims.

Similar reference characters refer to similar parts throughout the several views of the drawing.

Figures 1, 2:
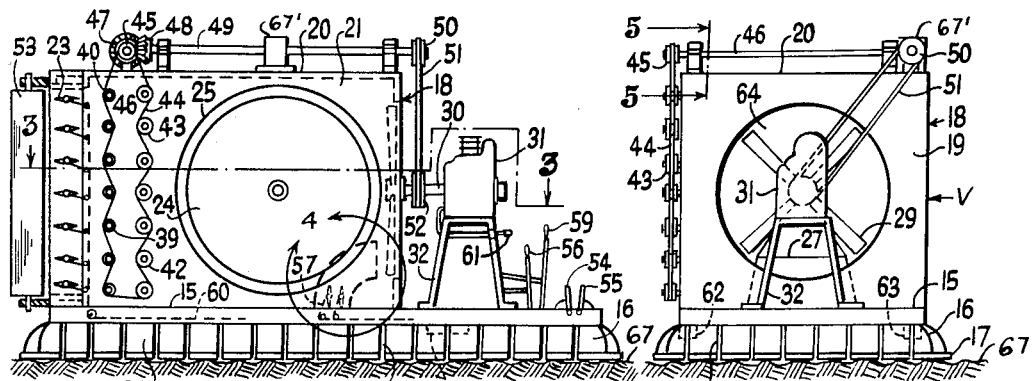
FIG. 1 is a side view of this invention.
FIG. 2 is a front view of this invention. The operators seat and controls are not shown.
Figure 3:
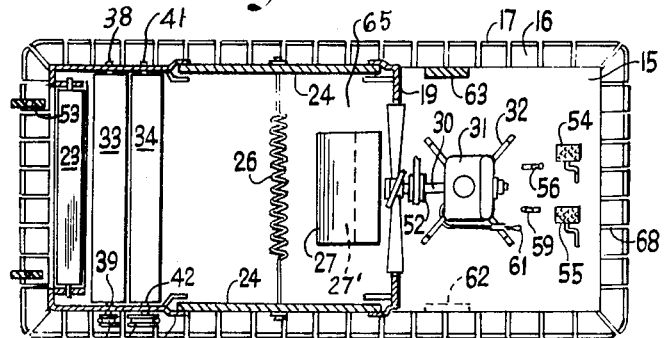
FIG. 3 is a sectional view taken substantially along line 3—3 of FIGURE 1 as viewed in the direction indicated by the arrows.
Figure 8:
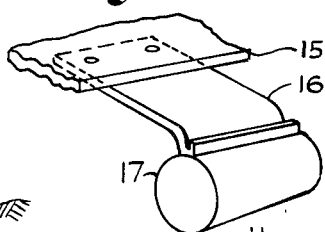
FIG. 8 is a pictorial view of one detail of this invention.

Having reference now to the drawing in detail, and in particular to FIGURE 1, 2 and 3, there is generally indicated by the reference character 15 a platform, preferably rectangular though it of course can be of any desired shape. A plurality of downwardly curved members 16 that may be made of rubberized belting or any other desired material. The said downwardly curved members are removably secured to the aforesaid platform, and the members are in spaced relation to each other around the periphery of the platform. The outer end of each one of the said curved members has an iron or concrete weight 17 secured thereto as clearly shown in FIGURE 8 of the appended drawings. The purpose of this curved member and weight will be fully described in the operation of this invention. A rectangular box 18 having a large circular opening on each side thereof and directly opposite each other is located on the rear portion of the aforesaid platform 15. The box 18 embodies a front 19, a top 20, a right side 21 and a left side 22. A plurality of later described shutters 23 occupy the entire rear end area of the box. A diaphragm 24 is located on the inside of and against the outwardly pressed flange 25 of the aforesaid opening in the box 18 as clearly shown in FIGURE 3 of the appended drawing where it is also seen that the two diaphragms are held in place by a coil spring 26 having one end secured to one diaphragm and the other end secured to the other diaphragm.

Figure 4:
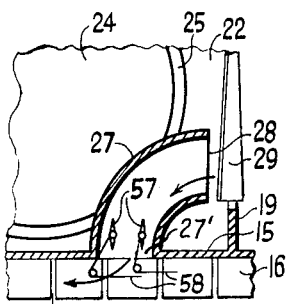
FIG. 4 is one detail of construction of this invention that is noted by the circle terminating in arrows and the numeral 4 in FIGURE 1.

Examination of FIGURES 3 and 4 of the appended drawing, show that there is a rectangular opening 27' in that part of the platform 15 covered by the forward portion of the aforesaid box 18. A curved air duct 27 has its outlet over the opening 27' while its inlet 28 is facing towards the tips of propeller 29 in the circular opening in the front 19 of the rectangular box 18. The propeller is on the end of a drive shaft 30 of the internal combustion engine 31 which is supported by a plurality of struts 32.

Figure 5:
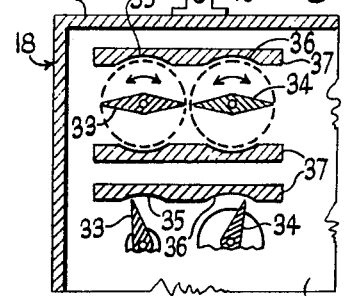
FIG. 5 is a sectional view taken substantially along line 5—5 of FIGURE 2 as viewed in the direction indicated by the arrows.

Returning again to FIGURES 1 and 3 of the drawing it will be seen at a glance that there are a plurality of lateral valve members 33 and a second set of valve members 34 which for the want of a better name I hereinafter call valves, both of which are just forward of the already mentioned shutters 23. The aforesaid valve members and valves have their tips rotate in part in the concave areas 35 and 36 of the plurality of valve plates 37 that are mounted as clearly shown in FIGURE 5 of the appended drawing. The aforesaid valve plates 37 are rectangular in plan form and extend from the right side 21 to the left side 22 of rectangular box 18 to which their ends are secured.

The said valve members 33 and 34 are in both horizontal and vertical spaced relation to each other, each valve member is supported at one end by a stub axle 38 protruding through the left side 22 while the other end of the same valve member is supported by a second stub axle 39 that protrudes through the right side 21 of the said rectangular box 18. A sprocket 40 is mounted on the outermost end of the said second stub axle of each one of the valve members 33 while still another stub axle 41 is mounted on the left end of valve 34 which it helps to support by protruding through the left side 22 of this Ground Effect Machine. A fourth stub axle 42 is secured to the right hand end of valve 34. This last mentioned stub axle protrudes through the right side 21. A sprocket 43 that is twice the diameter of the aforesaid sprocket 40 is mounted on the outermost end of the aforesaid stub axle 42. The just mentioned sprockets 40 and 43 provide a means of rotating the said valve member by a drive chain 44 on the outside of the already stated rectangular box 18. The chain is driven through a drive sprocket 45 on the end of drive shaft 46 on the top of rectangular box 18.

It is obvious from examination of FIGURES 1 and 2 of the appended drawing that the aforesaid drive shaft 46 is driven by level gears 47 and 48, the latter one being on one end of shaft 49 which is of course at right angle to drive shaft 46. A pulley 50 on the forward end of shaft 49 has a V belt 51 or its equivalent riding over the same and therefore rotating the said shafts and associated members by means of the drive pulley 52 on the previously mentioned drive shaft 30 of engine 31.

Looking at the rear end of this novel vehicle it is readily seen that a pair of vertically mounted air rudder 53 are secured to the rear of the said rectangular box 18 and are controlled by rudder pedals 54 and 55 to which they are connected by any mechanism known to those experienced in the art though none of this mechanism is shown in any of the appended drawings.

The construction of this Ground Effect Machine has now been given with the exception of the controls that are located forward of the operator's seat (not shown) in front of and below the aforesaid engine 31. A hand lever 56 controls the shutter 57 in the outlet of the curved air duct 27 by means of a cable 58 while a second hand lever 59 controls the shutter 23 by means of a cable 60 and a throttle 61 controls the speed of engine 31. A member 62 projecting down from under the right side of the previously stated platform 15 may, broadly speaking, said to be a control for the purpose described in the operation of this unique Ground Effect Machine, while a second member 63 projects down from under the left side of the aforesaid platform 15.

The few details of construction of this invention not yet described, will be given as the method of operation is set forth. Naturally the first step is the starting of the internal combustion engine 31 by any one of the desired means known to those experienced in the art, none of these means being shown in the appended drawings since they do not form a part of this invention.

Once the engine 31 is started the operator increases its speed by means of the aforesaid throttle 61. Air from the propeller 29 rotating just inside the circular opening 64 in the front 19 of rectangular box 18 enters chamber 65 and, when the previously described lateral valve members 33 and valves 34 close, air pressure builds up in the said chamber pushing the diaphragms 24 apart then when the aforesaid lateral valve member 33 and valves 34 open the air rushes out through the previously stated shutters 23 causing a jet reaction thus propelling the vehicle which is for the very first time given the reference character "V" forward or in any other desired direction.

The aforesaid shutters 23 are, as previously stated, manually controlled by a second hand lever 59 which, as previously stated, is connected to the shutters through a cable 60.

While the above described action is taking place, the aforesaid diaphragms 24 will move towards each other to uncover the previously described large circular openings in the sides of box 18 by reason of the tension of the coil spring 26 being greater than the air pressure in the said chamber. When the lateral valve members 33 and valve 34 close, the air pressure within the aforesaid chamber 65 overcomes the tension in coil spring 26 thus forcing the diaphragms 24 to move apart to cover said large circular openings as can readily be understood from examination of FIGURE 1 of the appended drawing.

At the same time this just described action is taken place a certain amount of the air will be forced down the curved air duct 27 through its inlet 28. This air, if the operator of the machine should open shutter 57 in the outlet end of the said air duct 27 by means of the previously described hand lever 56 and its control cable 58 which is attached to the said shutter 57 which it may be stated here now is a two piece construction, the air will enter chamber 66 which is the space between the underside of platform 15 and the ground 67 (FIGURES 1 and 2). This trapped air, being under pressure will lift the aforesaid Ground Effect Machine entirely off the ground and then free it from ground friction and make it possible for the vehicle to travel quickly and safely in any desired direction. The closing of the aforesaid shutter 57 by pulling back on its hand lever 56 will cause the machine to settle back down on the ground again.

It may be well to stop at this point and remember that the aforesaid lateral valve members 33 and valve 34 automatically open and close by reason of the previously described drive mechanism that connects the said drive chain 44 with the engine 31 through a series of shafts, gears and a V belt. Since the sprocket 43 is twice the diameter of sprocket 40 of the aforesaid mechanism the valve 34 will be wide open every half revolution of lateral valve member 33 which of course also rotates as indicated by the arrows in FIGURE 5 of the appended drawing. The constant opening and closing of the aforesaid valve members 33 and 34 interrupts the exhaust flow of air from the propeller 29. The flow of air in the already described chamber 65, being independent from the flow of air underneath the vehicle, will not cause any up and down flutter. The thrust multiplying action of the diaphragms 24 and recoil spring 26, due to energy being stored in the spring, when the valves 33 and 34 are closed, would cause a pulsating force when the valves open, but in a linear direction. These rapid pulses would be smoothed out by the very weight of the vehicle itself.

Although not herefore stated, a clutch 67' is placed on top 20 of the rectangular box 18 for the disengagement of the aforesaid lateral valve members 33 and valves 34 through the already described mechanism that includes the shaft 49 which is adapted to the clutch 67', the controls of which are not shown in any of the figures of the appended drawing, since they are not an actual part of this invention. The purpose of the clutch 67' is to permit the engine 31 to be started with ease, then engage the aforesaid clutch when the operator is ready to set this novel Ground Effect Machine in motion.

Since this vehicle actually rests on a pad of air under its aforesaid platform 15 when in motion, and only a few inches above the ground, the operator has only to lean to the right and tilt the vehicle over until its right member 62 projecting downward from the underside of the platform 15 drags the ground and then causes the said vehicle to swing to the right which is one way to steer the machine at low speed. If the operator should lean to the left, the second member herein characterized by the reference character 63 will drag the ground and swing the machine to the left.

When this vehicle is in forward or backward motion the twin air rudder 53 steers the same through the use of rudder pedals 54 and 55 which are connected to the rudders by means of cables or rods, neither of which is shown in the appended drawing.

Although the plurality of curved member 16 along with attached iron or concrete weight 17 were described in the very first part of this specification no mention was made as to their purpose as this can only be fully understood now that the method of operation of the vehicle has been explained.

The air forced into the previously stated chamber 66 which is of course the space between the underside of platform 15 and the ground, would escape without a lifting pressure built up, were it not for the said plurality of curved member 16 which confines the air under the platform. Fluttering of the said curved members by the air is prevented through the attachment of the iron or concrete weights 17. The openings 68 between the aforesaid curved member 16 not only act as a form of relief valve but are also there for reason of ease in the construction and maintenance of this novel vehicle.

Figure 6:
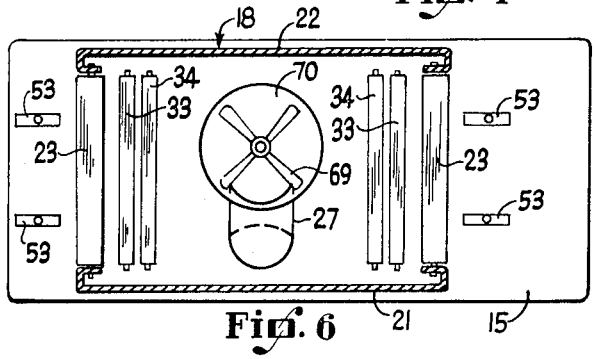
FIG. 6 is a view similar as FIGURE 3 but showing an optional form of construction in part and with some of the unchanged details removed.
Figure 7:
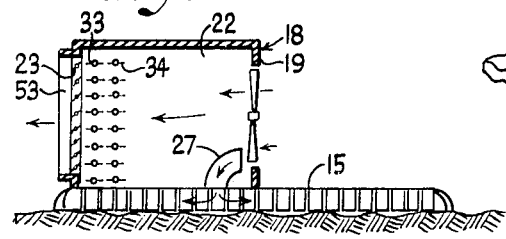
FIG. 7 is a side view of this invention with one side of the box and many of the details removed including the engine, propeller, operator seat and controls. Arrows indicate direction of air flow.

The basic form of construction and operation of my Ground Effect Machine has now been clearly stated. An optional arrangement of some of its major parts is shown in FIGURE 6 of the appended drawing. In this instance the propeller 29 is replaced with a propeller 69 that is in the opening 70 of top 20 of the rectangular box 18. All other parts of this modified form of this invention that are identical to those already described in both construction and operation, are identified by the same reference characters. This not only makes it much easier to understand the modification but does away with duplicating the method of construction and operation.

It is obvious from examination of the aforesaid FIGURE 6 that the only difference between this version and the original, other than the propeller location, is that in this model a second complete set of lateral valve members 33, valves 34 and associated drive mechanism (not shown in the said FIGURE 6) as well as the twin rudders 53. The installation of these duplicate parts on the front portion of the machine will permit greater reverse directional control of this Ground Effect Machine.

From the foregoing it will now be seen that there is herein provided an improved Ground Effect Machine that accomplishes all the objects of this invention, and others, including many advantages of great practical utility and commercial importance.

As many embodiments may be made of this inventive concept, and as many modifications may be made in the embodiment hereinbefore shown and described, it will be understood that all matter herein is to be interpreted merely as illustrative and not in a limiting sense.

I claim:

1. In a ground effect machine of the character described, comprising a rectangular platform having a plurality of downwardly curved flexible members removably secured thereto and in spaced relation to each other around its periphery, iron weights removably secured to the outer end of each one of the said downwardly curved members preventing flutter of the said members when the said machine is in operation, a rectangular box attached to the rear portion of the said platform and having an opening in one of the vertical walls thereof with a propeller therein so that air can be supplied from the ambient to the propeller, a pair of air rudders mounted to the rear end of the said box each rudder being in lateral spaced relation to the other, an internal combustion engine including a shaft mounted on a plurality of struts on the said platform and in front of the vertical wall of said box containing said opening, said propeller mounted on said shaft and projecting into the said box, the said platform having an opening therein over which is placed the outlet of a curved air duct located within the said box and in back of the lower confines of the said propeller for directing air from said propeller to the underside of the said platform thereby giving vertical movement to the said ground effect machine.

2. In an invention of the character described, comprising a rectangular platform having a rectangular box mounted on the rear portion thereof, an internal combustion engine mounted on the said platform and forward of the said rectangular box, the said engine driving a propeller on the end of a shaft projecting into the said rectangular box, an opening in the wall of said box adjacent said engine and through which air is directed to the propeller, manually controlled mechanism movably mounted in the said box for controlling an opening in the wall of the box remote from said first mentioned wall to permit air to escape from said box when desired to provide the thrust necessary for linear motion, the said rectangular platform having an opening therein and under the said box, an air duct having its air inlet in a plane that is at right angle to the said rectangular platform on which it is mounted, and a manually controlled shutter mounted within the said air duct to provide means of controlling the amount of air that enters through the air duct to the underside of the said rectangular platform which it lifts upward off the ground when the said propeller is rotating at a predetermined velocity that at the same time produces thrust for inducing linear motion to said ground effect machine.

3. In a ground effect machine of the character described, comprising a rectangular platform having a rectangular box mounted on the rear portion thereof, an internal combustion engine mounted on a plurality of struts on the said platform and forward to the said box, the said engine having a propeller mounted on a shaft that extends into the said box, an opening in the box through which air is directed to the propeller, mechanism within the said box for multiplying and directing thrust from the said propeller backward out the said box, thereby producing linear motion, other mechanism within the said box for directing air from the said propeller downward under the said rectangular platform thereby lifting the said ground effect machine off the ground, and a throttle controlling the speed of rotation of the said engine as well as manually operated mechanism controlling shutters on the back of the said box and manually operated air rudders back of the said shutters, the said rudders being controlled by foot pedals while all the other control mechanisms are of the hand type.

4. In a ground effect machine of the character described comprising a platform, the said platform being provided with a plurality of removably secured downwardly curved members around its periphery and in linear spaced relation to each other, a detachable weight secured to the outer edge of each one of the said downwardly curved members to prevent flutter when the said machine is lifted from the ground, the said platform having a box mounted thereon, the said box embodying a front having a circular opening therein, a right side having a flanged circular opening therein and a left side also having a flanged circular opening, a circular diaphragm adapted to rest over the inside of each one of the openings in the said right side and said left side, a coil spring having one end secured to the center of one diaphragm and the other end secured to the center of the other diaphragm, a plurality of rectangular shutters in the rear of the box and mounted laterally in horizontal spaced relation to each other and manually controlled by a lever pivotally mounted on the said platform and forward of the said box, and a plurality of lateral valve members and valves both which are rectangular as viewed from the top, the said valve members being secured next to the said shutters and the said valves being located next to and forward of the said lateral valve members, an internal combustion engine having a shaft on which is mounted a propeller adapted to rotate within the circular opening in the front of the said box, the said engine being mounted on a plurality of struts on the front portion of the said platform, chain, gear and belt drive mechanism interconnecting the said lateral valve members and valves to the said shaft of the internal combustion engine thereby automatically opening and closing the said lateral valve members and valves which controls the multiplied thrust generated by the said propeller and directs the same out through the said shutters thereby inducing linear motion to the said ground effect machine, the said platform having an opening therein and under the said box, a curved air duct secured over the opening in the said platform, a valve means within the said curved air duct manually controlled by a lever pivotally mounted on the said platform and next to the said lever controlling the said shutters, the said air duct providing passage for the air from the said propeller to the underside of the said platform thereby lifting the said ground effect machine off the ground, air also from the said propeller being forced backward through the said lateral valve members and said shutters thereby inducing forward motion to the said ground effect machine, a pair of air rudders vertically mounted on the rear of the said box and in lateral spaced relation to each other, mechanism connecting the said rudders with a pair of foot pedals that are swingably mounted on the said platform in front of the said levers, and a fixed member extending downward from the right side of the said platform while a like member extends downward from the left side of the said platform to provide a drag for turning the said ground effect machine in the lateral plane, the said downwardly extending members being fixed to the said platform approximately adjacent opposite sides of said engine.

References Cited by the Examiner

UNITED STATES PATENTS

| | | |
|---|---|---|
| 2,387,627 | 10/1945 | Warner. |
| 2,461,435 | 2/1949 | Neumann et al. |
| 2,838,257 | 6/1958 | Wibault. |
| 2,968,453 | 1/1961 | Bright. |

FOREIGN PATENTS

| | | |
|---|---|---|
| 219,133 | 11/1958 | Australia. |
| 1,251,967 | 12/1960 | France. |

OTHER REFERENCES

Publication: "Aviation Week"; July 6, 1959; pages 115 and 116.

Publication: "Design News"; May 23, 1960; pages 6 and 7.

A. HARRY LEVY, *Primary Examiner.*

PHILIP ARNOLD, *Examiner.*